July 31, 1934.    F. W. BINNS    1,968,024
METHOD OF TREATING VEGETABLE TANNING AGENTS OR COMPOSITION THEREFOR
Filed Nov. 3, 1930
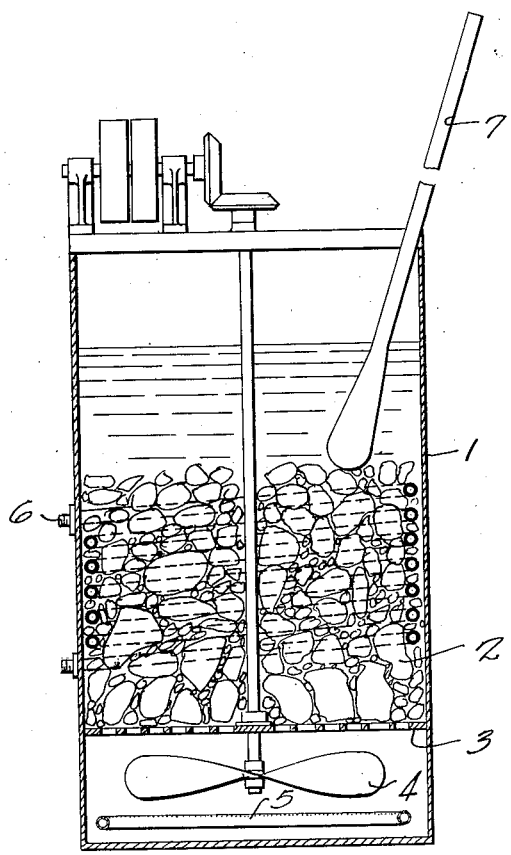
INVENTOR
FREDERICK W. BINNS
by Roberts, Cushman & Woodberry
ATTYS Patented July 31, 1934

1,968,024

UNITED STATES PATENT OFFICE 1,968,024

METHOD OF TREATING VEGETABLE TANNING AGENTS OR COMPOSITION THEREFOR

Frederick W. Binns, Quincy, Mass., assignor to Virginia Smelting Company, Portland, Maine, a corporation of Maine Application November 3, 1930, Serial No. 492,955

20 Claims. (Cl. 149—4)

This invention relates to tanning and provides a method of treating natural tanning materials whereby their properties and the properties of materials subsequently tanned therewith are improved.

As disclosed in my previously issued United States Patent, No. 1,741,496, dated December 31, 1929, I have shown that textile goods which have been dyed, such as colored rags and the like, may be effectively bleached with a solution prepared by the reaction of a reducing metal and sulfur dioxide in aqueous solution. The solution may be used as freshly prepared; it may also be partially stabilized and improved by the addition of a small quantity of formaldehyde, if desired. Goods which have been bleached with such solutions are not only free from color but are in an especially favorable condition for redyeing.

I have now extended my research upon the subject matter of said patent and find that it may be effectively employed in respect of the reagents used in tanning.

In the art of tanning leather, it is frequently desirable that the tanned leather product shall be of a light color and also of a uniform shade throughout its surface. This may be accomplished by employing mineral tanning agents, but natural or vegetable tanning agents are associated with substances which effectively darken the materials treated therewith and hence make it substantially impossible to produce a tanned product which is light in color. Moreover, the natural tanning agents are frequently composed of or contain solid particles which are of necessity left in the tanning liquor on account of their fineness and the impracticablity of removing them, and these tend to effect a concentration of the coloring agent upon the surface being tanned, so that the darkening may be greatly enhanced in such areas, giving the tanned surface an uneven appearance.

Accordingly, it is an object of the present invention to treat such natural tanning agents so as to control or substantially to overcome their coloring or dyeing propensities without diminishing their effectiveness as tanning agents. Another object is to provide and preserve a uniform dispersion of the finely divided solid particles of the tanning material. It is also an object to bring about these results in a simple operation or treatment which may be easily applied in the usual course of preparing or using the tanning agent. Other objects will appear from the following disclosure.

Stated in general terms, the method of the invention includes the treatment of natural vegetable tanning reagents with an alkaline solution of a hydrosulfite—or with hydrosulfite and an alkali hydroxide—preferably with an alkali and a solution of zinc hydrosulfite,—either as freshly prepared by the addition of zinc and sulfur dioxide in the presence of water or such a solution which has been partially stabilized by the addition of a small amount of formaldehyde, as disclosed more fully in my United States patent above referred to,—whereby the coloration of the tanning material is effectively reduced or removed and products subsequently tanned therewith may be finished with lighter and more uniform colors accordingly.

For example, a suitable treating solution may be prepared by adding 28 pounds of a reducing metal such as zinc dust to 42 gallons of water and stirring vigorously (in a vessel containing a cooling coil) to produce a fairly uniform suspension of the powdered metal. A stream of sulfur dioxide (preferably liquid) may then be introduced into the bottom of the suspension mixture, to the ultimate amount of 40 pounds, with agitation but preferably without frothing or foaming.

The solution as thus obtained may be used satisfactorily if shortly after it has been freshly prepared. If it is to be kept in storage before use, however, it is advantageous to treat the solution with a relatively small proportion of formaldehyde of the order of 10% or less upon the weight of the sulfur dioxide content, e. g., 1½ pounds of formaldehyde, with vigorous stirring for five minutes.

If an alkali metal hydrosulfite is to be employed, instead of the zinc hydrosulfite solution above described, it may be obtained by adding a chemical equivalent of the hydroxide of the alkali, such as sodium hydroxide to the zinc hydrosulfite solution, whereupon a metathetical reaction takes place, forming the alkali hydrosulfite and zinc hydroxide. The latter may be removed by filtering.

The freshly prepared solution or the solution partially stabilized with formaldehyde may then be added directly to the vegetable tanning agent, which preferably has been previously or simultaneously treated (as with alkali hydroxide or an alkali bisulfite) to render it soluble. The tanning agent is ordinarily disintegrated and treated in the condition of an aqueous suspension or solution.

The suspension or solution of the tanning material may be heated before or after the addition of the hydrosulfite solution, e. g., to 150° F. or above. The hydrosulfite solution is run in slowly and with constant agitation and heating until the desired lightening or loss of color is attained or until further additions are not accompanied by further lightening of the tanning agent.

It is now further found that whereas vegetable tanning materials are usually intrinsically acidic, and whereas the procedure above described may be satisfactorily carried out upon materials which have been extracted with the aid of alkaline reagents, the material should preferably be treated with an alkali (caustic soda, for example when zinc hydrosulfite is to be used) preliminary to the bleaching treatment. In such treatment with alkali, the amount added is directly determined by the tannin content of the material and on the one hand is insufficient to render the charge alkaline or even neutral to litmus, but on the other serves to reduce appreciably its concentration of free hydrogen ions, or acidity, and to prevent precipitation of the tannin materials. The resulting treated liquor, which is thus partially neutralized, also promotes a finer subdivision and preserves a more uniform dispersion of the solid matter which it contains. It also facilitates and controls the bleaching action of the hydrosulfite, which may be added simultaneously with or after the addition of the alkali. It likewise controls, to an appreciable extent, the degree of bleaching to be effected and consequently the color of the tanning material. This reduction of color is especially notable after the treated tanning extract has been diluted with water which is customary in preparing the tanning bath. The diluted, treated solution is characterized by having a light color, varying from orange to yellow (in proportion to the amount of caustic alkali added) as distinguished from the original red or pink coloration which the untreated quebracho extract usually exhibits.

This aspect of the invention will be described with reference to the accompanying drawing, in which the figure is a side elevation of suitable apparatus for carrying it out in actual practice.

Thus, 100 pounds of common salt may first be dissolved in 130 gallons of water in tank 1, to which approximately 1000 pounds of quebracho 2, in lump form (containing, for example, 63% of tannins) may then be added. The quebracho lumps are preferably supported by a false bottom 3, below which may be provided an agitating paddle 4 which is rotated by any appropriate means while live steam is introduced through the perforated coil 5. The salt promotes the separation and dispersion of the quebracho throughout the solution to form a relatively finely divided suspension of the same while the steam heats the charge substantially to boiling, thus promoting the solution of the soluble components. Such heating and agitation may be continued for several hours, and the charge then allowed to cool to approximately 180° F. Such procedure is common to the art as now practiced and, instead of common salt, other salts such as sodium bisulfite may be employed, with like results. On standing, the solid tanning materials separate from such suspension, to form a sludge.

The alkaline reagent is preferably dissolved in a suitable amount of water, in a separate vessel, and allowed to cool. In the instant case 32.5 pounds of caustic soda (which is approximately 5% by weight of the tannin content) may be dissolved in 8.25 gallons of water and allowed to cool over night to room temperature. The absolute amount or proportion of alkali employed will be varied in proportion to the tannin content of the material and also to control the color of the bleached product and may, for example, be 10% above or below the amount mentioned. Such variations produce a range from orange to yellow, respectively, in the treated solution. The amount of alkali may also be further varied when previous treatments of the quebracho have added alkaline (or acidic) reagents thereto, such as caustic soda and sodium bisulfite which are sometimes employed in the preparation of the extract.

The alkaline solution is now added to the quebracho extract or suspension but preferably in small quantities and alternately with corresponding additions of the hydrosulfite solution to avoid excessive reaction or local concentrations of the alkali. In this way, approximately 25 gallons of hydrosulfite solution (prepared by the reaction of 31.1 pounds of zinc and 50 pounds of sulfur dioxide in water, and 2.6 pounds formaldehyde) may be added to the charge. During such additions, the charge is constantly and thoroughly agitated (preferably by stirring the same, by hand, with wooden paddles 7) and may be heated to 200° F. (by the further introduction of steam) which temperature is maintained for approximately one-half hour. The charge may then be cooled, as by cooling coils 6.

After heating and before cooling, the batch is brought to a volume of 200 gallons by the addition of water.

The treated extract, as thus obtained, is concentrated and of relatively thick consistency, resembling molasses in appearance. It may be used immediately, or may be stored and shipped in this condition, as desired, without undergoing any appreciable change. When it is to be used for tanning, however, it is diluted with ten to twenty parts of water, or more, and forms a thin, light colored, uniform tanning bath. The zinc hydrosulfite, in the solution of modified acidity as thus obtained, hydrolyses appreciably upon dilution with water to form colloidal zinc hydroxide. The latter, without separating out, increases the density of the solution as a whole and serves to maintain the suspension of the solid particles of tanning material. Thus the uniformity of the tanning liquid is preserved and its effects upon material tanned therewith are entirely uniform. Moreover, the finely divided solids of the tanning material are thus utilized instead of forming a wasteful and annoying sludge in the bottom of the tanning bath.

Other modifications and adaptations of the invention may be made, not only with other vegetable tanning agents but with the addition or in the presence of other reagents which may sometimes be employed for the obtainment of special conditions or effects in the specific procedure to be followed. Such applications of the invention, however, are to be considered as comprehended by the specification and included by the following claims.

This application is a continuation in part of my application Serial No. 475,635, filed August 15, 1930.

I claim:

1. Process of preparing tanning agents, which comprises the step of subjecting a vegetable tanning agent to the chemical action of a freshly made solution resulting from the addition of zinc dust and sulfur dioxide to water.

2. Process of preparing tanning agents, which comprises the step of subjecting a vegetable tanning agent to the chemical action of a solution resulting from the addition of zinc dust and sulfur dioxide to water and formaldehyde in an amount less than 10% by weight of the sulfur dioxide component.

3. Process of preparing tanning agents, which comprises the step of subjecting a vegetable tanning agent to the chemical action of a freshly made solution resulting from the addition of one part of zinc dust and one and one-half parts of sulfur dioxide to water.

4. Process of preparing tanning agents, which comprises the step of subjecting a vegetable tanning agent to the chemical action of a solution resulting from the addition of one part of zinc dust and one and one-half parts of sulfur dioxide to water, and formaldehyde in an amount less than 10% by weight of the sulfur dioxide component.

5. Process of preparing tanning agents, which comprises the step of subjecting a vegetable tanning agent to the chemical action of a solution resulting from the addition of a reducing metal and sulfur dioxide to water.

6. A tanning composition, comprising a vegetable tanning agent bleached by the reaction products of metallic zinc, sulfur dioxide and water.

7. A tanning composition, comprising a vegetable tanning agent bleached by the reaction products of metallic zinc, sulfur dioxide and water, and formaldehyde in an amount less than 10% by weight of the sulfur dioxide.

8. A tanning composition, comprising quebracho extract bleached by the reaction products of metallic zinc, sulfur dioxide and water.

9. A tanning composition, comprising quebracho extract bleached by the reaction products of metallic zinc, sulfur dioxide and water, and formaldehyde in an amount less than 10% by weight of the sulfur dioxide.

10. Process of preparing vegetable tanning agents, which comprises the step of treating the same with an alkali hydrosulfite.

11. Process of preparing vegetable tanning agents, which comprises the step of treating the same with an alkali to control the acidity and with an alkali hydrosulfite.

12. Process of preparing vegetable tanning agents, which comprises the step of treating the same with approximately 5% by weight of an alkali upon the weight of the tannin content, to control the acidity, and with an alkali hydrosulfite.

13. Process of preparing vegetable tanning agents, which comprises the step of treating the same with caustic alkali to control the acidity and with zinc hydrosulfite.

14. Process of preparing vegetable tanning agents, which comprises the step of treating the same with caustic alkali to control the acidity and with the freshly prepared reaction product of zinc and sulfur dioxide in water.

15. Process of preparing vegetable tanning agents, which comprises the step of treating the same with an alkali to control the acidity and with an alkali hydrosulfite and formaldehyde.

16. Process of preparing vegetable tanning agents, which comprises the step of treating the same with an alkali to control the acidity and with the reaction product of a reducing metal and sulfur dioxide in water.

17. A tanning composition, comprising a vegetable tanning agent to which an alkali reagent has been added in an amount approximately 5% by weight of the tannin content and an alkali hydrosulfite.

18. A tanning composition, comprising a vegetable tanning agent to which an alkali reagent has been added in an amount approximately 5% by weight of the tannin content and zinc hydrosulfite.

19. A tanning composition, comprising a vegetable tanning agent to which caustic has been added in an amount approximately 5% by weight of the tannin content and zinc hydrosulfite.

20. A tanning composition, comprising a vegetable tanning agent to which caustic soda has been added in a mount approximately 5% by weight of the tannin content and zinc hydrosulfite.

FREDERICK W. BINNS.